United States Patent
Zavaljevski et al.

(10) Patent No.: US 6,236,766 B1
(45) Date of Patent: May 22, 2001

(54) METHOD AND APPARATUS FOR ZOOMING DIGITAL IMAGES

(75) Inventors: Aleksander Zavaljevski; Christopher J. Mussack; David M. Deaven, all of Waukesha, WI (US)

(73) Assignee: General Electric Company, Waukesha, WI (US)

( * ) Notice: Subject to any disclaimer, the term of this patent is extended or adjusted under 35 U.S.C. 154(b) by 0 days.

(21) Appl. No.: 09/151,431

(22) Filed: Sep. 11, 1998

(51) Int. Cl.$^7$ .................................................. G06K 9/32
(52) U.S. Cl. ........................ 382/300; 382/254; 382/279
(58) Field of Search ........................ 382/300, 295, 382/279, 254, 274, 275, 276, 277, 278, 282, 298, 299; 345/130, 137, 138, 132; 358/428, 451

(56) References Cited

U.S. PATENT DOCUMENTS

| | | | |
|---|---|---|---|
| 4,633,503 | 12/1986 | Hinman | 382/47 |
| 5,008,752 | 4/1991 | Van Nostrand | 358/160 |
| 5,125,043 | 6/1992 | Karlsson | 382/47 |
| 5,241,372 | * 8/1993 | Ohba | 358/22 |
| 5,264,846 | * 11/1993 | Oikawa | 341/76 |
| 5,294,998 | * 3/1994 | Piovoso et al. | 358/428 |
| 5,307,167 | 4/1994 | Park et al. | 348/704 |
| 5,917,961 | * 6/1999 | Huonder | 382/279 |
| 5,930,407 | * 7/1999 | Jensen | 382/300 |
| 5,949,920 | * 9/1999 | Jordan et al. | 382/279 |
| 6,005,983 | * 12/1999 | Anderson et al. | 382/254 |
| 6,018,597 | * 1/2000 | Maltsev et al. | 382/260 |

FOREIGN PATENT DOCUMENTS

| | | |
|---|---|---|
| 96/19777 | 6/1996 | (EP) . |
| 2313727 | 12/1997 | (GB) . |

OTHER PUBLICATIONS

*Affine Transformations of Images: A Least Squares Formulation*, IEEE 1994 pp. 558–559, Unser, et al.
*Adaptive multilevel classification and detection in multispectral images*, Paper 21105, Zavaljevski, et al.
International Search Report, application No. PCT/US 99/19966.

\* cited by examiner

*Primary Examiner*—Leo Boudreau
*Assistant Examiner*—Kanji Patel
(74) *Attorney, Agent, or Firm*—Quarles & Brady, LLP; Christian G. Cabou

(57) ABSTRACT

A method and apparatus for magnifying a portion of a digital image on a display screen in either of two ways. The first method includes a two pass scheme, where each of the passes represents an interpolation in x and y direction respectively, cubic interpolation in each direction is approximated using a one dimensional convolution filter followed by linear interpolation. The second method uses a two dimensional convolution filter first, followed by bilinear interpolation. All of the procedures that are used are accelerated using a hardware package which facilitates exceptionally fast execution.

35 Claims, 7 Drawing Sheets

METHOD AND APPARATUS FOR ZOOMING DIGITAL IMAGES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to imaging methods and apparatus and more specifically to a method and apparatus which facilitates magnification or zooming of a portion of an image on a display.

Digital imaging is extremely important in many different applications. For example, digital imaging has proven invaluable in the medical imaging art where vast amounts of data are collected and used to generate images for observation on a video monitor or display. Although not so limited, in the interest of simplifying this explanation the present invention will be described in the context of medical imaging. A typical display includes a two-dimensional raster of pixels. For the purpose of this explanation, although raster pixels may be arranged in any of several different configurations, it will be assumed that pixels are arranged in distinct rows and columns.

To generate images on the display a processor collects all image data and generates intensity signals or pixel values for each display pixel. The pixel values are provided to a video driver which excites each pixel separately in accordance with an associated pixel value. From a distance the contrast between display pixel intensities is seen as an image.

Magnification of digital images in real time is needed in many different applications. For example, it may be advantageous to magnify a section of a medical image which includes a tumor. To this end, software has been developed which allows a user to select an image section for magnification and then magnifies the selected section.

One problem with image magnification has been selecting pixel intensities in a magnified image which reflect the initial image and result in a clean magnified image. For example, assume an intensity range between 0 and 100 where first and second adjacent pixel values correspond to intensities 55 and 92. Also assume that upon magnification, the area corresponding to the first and second pixels increases and covers 32 pixels (e.g. 16 pixels each). In this case, if the 16 magnified pixels corresponding to the first pixel and the 16 magnified pixels corresponding to the second pixel are provided with intensities 55 and 92, respectively, and all other magnified pixels are similarly magnified, the result is a highly granulated image which, in many cases, is not useful for the intended purpose of closer examination.

Instead of exciting pixels in the magnified image as indicated above (i.e. with either intensities 55 or 92), other solutions have been adopted by the industry with varying success and at varying costs. The most common methods for calculating new pixel intensities are nearest neighbor, bilinear and bicubic interpolation methods.

According to the nearest neighbor method, when points corresponding to first and second adjacent pixels on an initial image are separated by magnification so that the initial image points correspond to third and fourth pixels which are separated by a plurality of other pixels, the intensity of each of the other pixels (e.g. pixels between the third and fourth) are set equal to the intensity of the closest of the third or fourth pixel. This solution has the advantage of being computationally simple and therefore can be implemented easily using existing imaging hardware. Unfortunately, nearest neighbor methods only increase magnified image quality slightly and therefore are unacceptable for many applications.

Bilinear methods generally linearly fill in pixel intensities. For instance, in the example above where points corresponding to first and second adjacent pixels on an initial image are separated by magnification so that the initial image points correspond to third and fourth pixels which are separated by three other pixels and the first and second pixel intensities were 55 and 92, respectively, the other pixel intensities are linearly determined and are approximately 64, 73 and 83. High speed bilinear image magnification is now commonly available in accelerated graphics hardware. Unfortunately, while this solution generates a better image than the nearest neighbor methods, this solution requires much more processor time to perform necessary computations and still does not provide an extremely accurate magnification.

Bicubic interpolation methods generally take into account the intensities of more than just first and second adjacent pixels when determining the intensities of pixels in a magnified image which are between image points which correspond to the initial first and second pixels. In effect, these interpolation methods mathematically identify pixel intensities on one or more curves wherein the curves correspond to proximate initial pixel intensities of several pixels about an area.

These interpolation methods are extremely accurate and generate diagnostic quality magnified images. Unfortunately, these methods require massive amounts of processor time and therefore, in many cases, cannot be performed in real time because of processor limitation. For this reason high quality bicubic image magnification is not generally available.

One way to speed up calculations is to provide special hardware which is specifically designed to perform specific calculations. For example, many image processing systems include special hardware to perform either one or two dimensional high speed convolution filtering and linear or bilinear interpolation processes required in many imaging application. Unfortunately, hardware solutions have not yet been provided to facilitate bicubic interpolation.

Therefore, it would be advantageous to have a method and an apparatus which can be used with existing hardware to facilitate image magnification wherein resulting magnified images are of a quality which is essentially identical to the quality achievable using bicubic interpolation and wherein the method facilitates real time magnification.

BRIEF SUMMARY OF THE INVENTION

It has been recognized that specific hardware which already exists in many imaging work stations can be used to imitate bicubic interpolation thereby providing extremely accurate image magnification. Importantly, while the functions and calculations performed by the hardware are extremely computationally intensive, the special hardware can perform the functions and calculations extremely quickly thereby giving the appearance of real time zooming or magnification.

Generally, the hardware includes a convolver, an interpolator, and a processor for identifying convolver coefficients. After the coefficients are identified, the convolver convolves pixel intensities for each pixel in the original image region to be magnified thereby generating at least two intermediate values. The interpolator interpolates the intermediate values to generate output pixel intensities.

Specifically, according to a one dimensional method of zooming, the invention includes a method and apparatus to be used with a digital imaging system to facilitate magnification of a region of interest on an initial digital image wherein the region of interest includes a plurality of pixels of interest, adjacent halves of adjacent pixels of interest forming interpixel intervals of interest. Each pixel of interest is characterized by a pixel intensity. The system includes convolution filter and interpolation hardware. The method comprises the steps of, for each interpixel interval of interest, identifying adjacent pixels, for each adjacent pixel, identifying a convolution window and for each window, determining a convolution filter coefficient for each pixel in the window, convoluting the pixel intensities of the pixels in each window using the coefficients to generate an intermediate value, and interpolating the intermediate values to generate interpolated pixel intensities, the interpolated pixel intensities together forming an interpolated image.

Preferably, according to the one-dimensional method, the initial pixel array is arranged in y columns and x rows and the step of selecting includes the step of, for each interpixel interval of interest between pixels in adjacent columns, selecting first and second row convolution windows consisting of pixels which are in the same row as the interval of interest and wherein, the method further includes the steps of, for each interpixel interval between pixels in adjacent rows on the interpolated image, selecting first and second separate column convolution windows on the interpolated image, each column window including adjacent image pixels within the same column as, and proximate the interpixel interval of interest, for each window, determining a convolution filter coefficient for each pixel in the window and convoluting the pixel intensities in each window using the coefficients to generate an intermediate value, and interpolating the intermediate values to generate a final pixel intensity, the final pixel intensities together forming the final image. The invention also includes a two-dimensional method and apparatus for zooming which is similar to the one-dimensional method and apparatus.

In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE INVENTION

A. Theory

Figure 1:
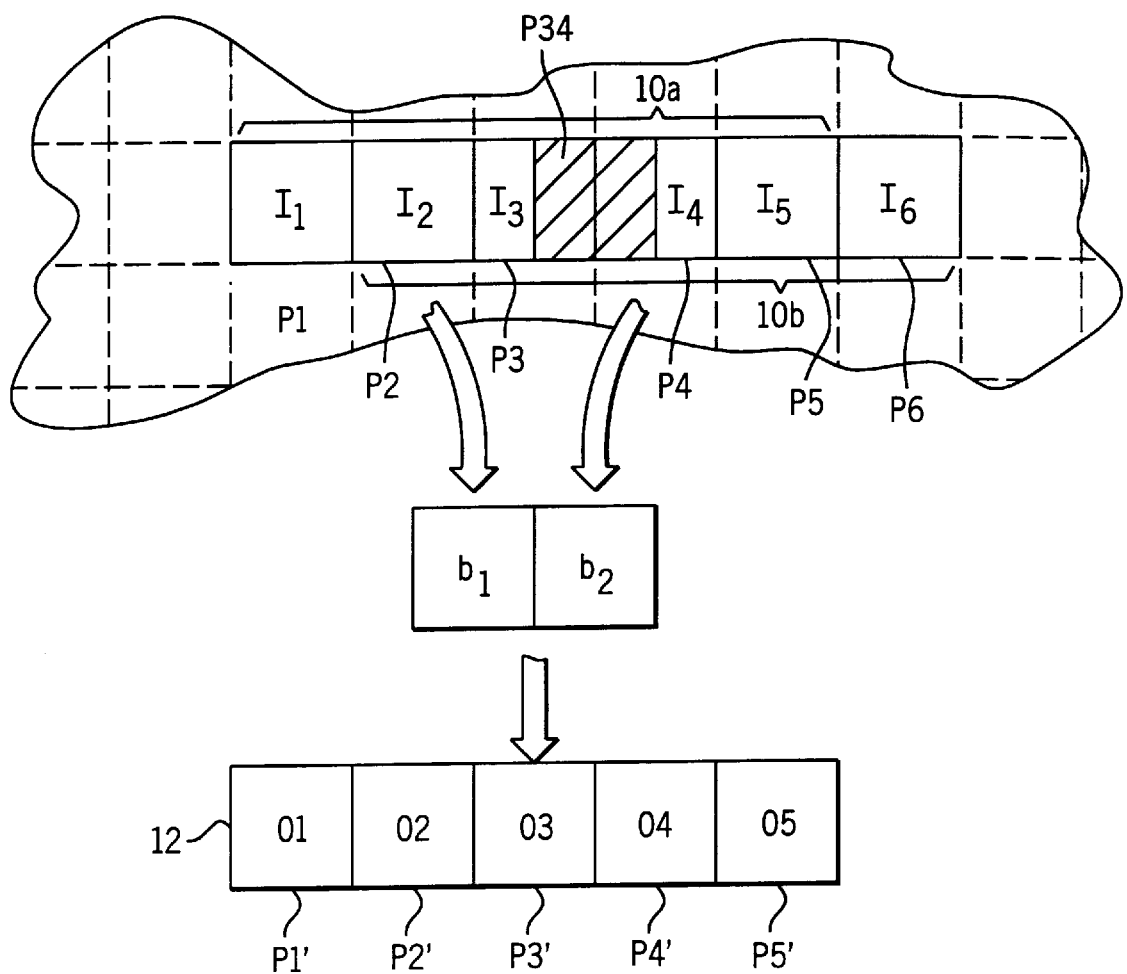
FIG. 1 is a schematic view illustrating one dimensional convolution interpolation methods according to the present invention.

Generally, it has been recognized that bicubic interpolation can be closely estimated or mimicked by performing a two-dimensional convolution of initial pixel intensities to generate intermediate values and then linearly interpolate between intermediate values to generate specific final image pixel intensities. While such convolution and interpolation procedures are computationally intensive, many imaging systems now include hardware which can perform required computations extremely quickly such that computations appear to be performed in real time. Specifically, the hardware includes convolution filters and linear or bilinear interpolators which can quickly provide the functions required to estimate pixel intensities which would be generated via software based bicubic interpolation.

Some systems only include hardware which can be used to perform either one or two-dimensional convolution and either linear or bilinear interpolation. The present invention includes a first method referred to herein as a one-dimensional convolution (ODC) method which can be used by hardware which is limited to one-dimensional convolution and linear interpolation to estimate output pixel intensities. In addition, the present invention also includes a second method referred to herein as a two-dimensional convolution (TDC) method which can be used by hardware which can perform two-dimensional convolution and bilinear interpolation to estimate output pixel intensities. Each of the one and two-dimensional convolution methods is described separately below.

In each of the methods below it will be assumed that display pixels are arranged in x horizontal rows and y vertical columns. In addition, it will be assumed that a command received from a user indicates that a specific image region should be magnified by a factor n where n is 5 (i.e. magnification is by a factor of 5). Thus, generally, the area of a first image which corresponds to a single pixel will be magnified such that the same area in the final image corresponds t o a b lock of pixels having 5×5 dimensions. The region to be magnified will be referred to herein as a region of interest and each pixel within the region of interest will be referred to as a pixel of interest.

1. One-Dimensional Convolution (ODC) Method

According to the ODC method, when a command is received to magnify region of interest by a factor of n, prior to convolution and interpolation an expanded region of interest which includes the region of interest and an additional number of rows above and below the region of interest is selected. The additional rows in the expanded must be processed in the x dimension so that data is generated for processing in the y dimension. This requirement will become more clear below.

After the expanded region has been selected, convolution and interpolation hardware is used to modify pixel data first in the x (i.e. row) dimension to generate an interpolated image. Thereafter, the interpolated image data is fed again to the convolution and interpolation hardware which modifies the pixel data in the y (i.e. column) dimension thereby generating a final or output image. Each pass through the hardware includes a two step process corresponding to each pixel processed during the pass. In the first step, for each pixel in the image being processed the convolution hardware selects a separate convolution window on the image being processed (i.e. on the initial image during the first pass and on the interpolated image during the second pass). During the first pass each window (i.e. a row window) is in the same row as a corresponding pixel of interest and during each second pass each window (i.e. a column window) is in the same column as a corresponding final pixel. In addition, each window includes pixels adjacent the pixel of interest. The number of pixels in each convolution window depends on a filter size m where m is typically a number of pixels (e.g. 5, 7, etc.). Hereinafter m will be assumed to be 5 unless indicated otherwise.

To better understand convolution windows and the inventive ODC method refer to FIG. 1 wherein six initial pixels P1 through P6 are illustrated. The pixels P1 through P6 are to be magnified by a factor of 5. For the purpose of this explanation, when referring to the ODC method, the term "interpixel interval" will be used to refer to adjacent halves of adjacent pixels. For example, in FIG. 1, an interpixel interval corresponding to pixels P3 and P4 is identified in phantom as P34. Similarly, there is an interpixel interval between each other two adjacent pixels. To magnify pixels P1 through P6, according to the ODC method each interpixel interval is magnified by a factor of 5. To this end, two convolution windows including m pixels are selected which correspond to each interval. For example, where a filter size m is 5, for interval P34, the windows are first window 10a including pixels P1 through P5 and second window 10b including pixels P2 through P6. The intensities of pixels P1 through P6 are identified as $I_1$ through $I_6$.

When the 5 times magnification request is received, in effect, the area in the initial image corresponding to each interpixel interval is first expanded in the x dimension to cover five pixels. For example, in FIG. 1, the area corresponding to interpixel interval P34 is expanded into interpolated pixels P1' through P5' having intensities O1 through O5 forming an output pixel block 12. Similarly, the interval areas between other initial adjacent pixel pairs P1 and P2, P2 and P3, P4 and P5 and P5 and P6 are each expanded into five distinct interpolated pixel intensities. Thus, pixels P1 through P6 are first expanded in the x dimension to form 25 separate interpolated pixels (i.e. 5 output pixels corresponding to each interpixel interval), each output pixel characterized by a separate intensity. Thereafter, the same procedure is repeated in the y dimension to provide five separate output pixel intensities for the area between any two adjacent interpolated pixels.

Referring still to FIG. 1, to expand interval P34 in the x dimension, convolution windows 10a and 10b are first selected about adjacent pixels P3 and P4. After convolution windows 10a and 10b have been selected the convolution hardware convolutes each of the windows 10a and 10b separately, thereby generating two intermediate values $b_1$ and $b_2$, respectively. The convolution equations for intermediate values $b_1$ and $b_2$ are expressed as:

$$b_1 = \sum_{i=1}^{m} a_i I_i \quad (1)$$

and $$b_2 = \sum_{i=1}^{m} a_i I_{i+1} \quad (2)$$

where $a_i$ are coefficients of the convolution filter which depend on the magnification factor n, where, in this example, n is 5.

After each of intermediate values $b_1$ and $b_2$ have been identified, the intermediate values are provided to the linear interpolation hardware which interpolates intensities $b_1$ and $b_2$ across n output pixels. To this end, the interpolation hardware performs the following equations to determine intensities $O_k$ of final pixels P1', P2', P3', P4' and P5' where k is 1 through n, in the present example 1 through 5. Where n is odd:

$$O_k = \frac{(n-k+1)}{n} b_1 + \frac{(k-1)}{n} b_2 \quad (3)$$

and, where n is even:

$$O_k = \frac{(n-k+0.5)}{n} b_1 + \frac{(k-0.5)}{n} b_2 \quad (4)$$

Substituting values $b_1$ and $b_2$ from Equations 1 and 2 into Equations 3 and 4 and simplifying yield, where n is odd:

$$O_k = \frac{(n-k+1)}{n} \sum_{i=1}^{m} a_i I_i + \frac{(k-1)}{n} \sum_{i=1}^{m} a_i I_{i+1} \quad (5)$$

and where n is even:

$$O_k = \frac{(n-k+0.5)}{n} \sum_{i=1}^{m} a_i I_i + \frac{(k-0.5)}{n} \sum_{i=1}^{m} a_i I_{i+1} \quad (6)$$

Equations 5 and 6 can be expressed as:

$$O_k = \sum_{i_1=1}^{m+1} \sum_{i_2=2}^{m} \lambda_{i_1 i_2} a_{i_2} I_{i_1} \quad (7)$$

where the $\lambda_{i_1 i_2}$ values are a function of the coefficients with corresponding I values from either Equation 3 or Equation 4, depending on if n is odd or even. For example, if n is odd and $i_2$ is 1, $\lambda_{i_1 i_2}$ is from Equation 3 or:

$$\lambda_{i_1 1} = \frac{n-k+1}{n} \quad (8)$$

The only unknowns in Equation 7 are convolution filter coefficients $a_{i_2}$. Therefore, if coefficients $a_{i_2}$ can be identified for a specific magnification factor n, Equations 1, 2 and 3 in the case of an odd factor n or, in the case of an even factor n, Equations 1, 2 and 4, can be performed to determine intensities O1–O5 of pixels P1'–P5'.

To identify the convolution filter coefficients $a_{i_2}$, a set of equations similar to Equation 7 is first derived in accordance with conventional bicubic interpolation methods. Thereafter common coefficients of Equation 7 and the cubic Equations are set equal and solved for the convolution filter coefficients. To this end, as well known, where there are four equidistant points $x_1$, $x_2$, $x_3$ and $x_4$ on an image and a function f defines intensity values $I_1$, $I_2$, $I_3$ and $I_4$ of the four points, respectively, the intensity value of the function at some point x between points $x_2$ and $x_3$ can be determined as follows. First, assume dx is the normalized distance defined by:

$$dx = \frac{x - x_2}{x_3 - x_2} \tag{9}$$

with distance dx so defined, the following cubic coefficients $c_1$ through $c_4$ can be calculated:

$$c_1 = -\frac{1}{3}dx + \frac{1}{2}(dx)^2 - \frac{1}{6}(dx)^3 \tag{10}$$

$$c_2 = 1 - \frac{1}{2}dx - (dx)^2 + \frac{1}{2}(dx)^3 \tag{11}$$

$$c_3 = dx + \frac{1}{2}(dx)^2 - \frac{1}{2}(dx)^3 \tag{12}$$

$$c_4 = -\frac{1}{6}dx + \frac{1}{6}(dx)^3 \tag{13}$$

The intensity value $O_k$ of function f at point x, using cubic interpolation can therefore be expressed as:

$$O_k = f(x) = \sum_{i=1}^{4} c_i I_1 \tag{14}$$

Comparing Equations 7 and 14, and equating coefficients with corresponding input pixel intensities $I_i$, a set of up to four linear equations for the convolution filter coefficients $a_{i_2}$ can be expressed as:

$$\sum_{i_2=1}^{m} \lambda_{ii_2} a_{i_2} = c_i \tag{15}$$

All four cubic coefficients $c_i$ can be determined by solving Equations 10 through 13 and, therefore, the only unknown values in Equation 15 are the five coefficients $a_1$ through $a_5$.

To generate additional equations for determining coefficients $a_1$ through $a_5$, the procedure above is repeated for each of the output pixels. Thus, referring again to FIG. 1, because n is 5 and there are therefore five output pixels P1' through P5' in block 12, four $c_i$ values are generated for each separate pixel P1' through P5' to generate twenty $c_i$ values and appropriate equations like Equation 15, a separate equation for each of the twenty $c_i$ values. Thus, twenty (i.e. 4n) cubic equations are derived with only 5 (i.e. m) unknowns (i.e. $a_1$ through $a_5$).

There can be less than four equations if the pixels obtained by bilinear interpolation used by the convolution filter do not have any contribution from some input pixels $I_i$. In this case, the number of equations is reduced by the number of such pixels.

The system of 4n equations can be expressed in matrix form as:

$$C = \Lambda A \tag{16}$$

where C is the vector of corresponding coefficients $c_i$ from right sides of equations 15, $\Lambda$ is the matrix of coefficients $\lambda_{ij}$ of those linear equations, and A is a vector of m filter coefficients $a_j$. For practical values of zoom factors n and filter sizes m the matrix of Equation 16 represents an over determined system of linear equations. In this case, the solution to matrix Equation 16 is determined by using the linear least squares method which takes the form:

$$A = (\Lambda^T \Lambda)^{-1} \Lambda^T C \tag{17}$$

The linear least squares method and in particular Equation 17 are well known in mathematics and therefore will not be explained here in detail. For a general explanation of the linear least squares method reference should be had to any standard algebra text which teaches matrix algebra.

Upon determining the coefficients aj corresponding to the convolution filter that is to be applied, the whole procedure for zooming digital images is defined.

2. Two-Dimensional Convolution (TDC) Method

According to the TDC method, when a command is received to magnify a region of interest by factor n, a two dimensional hardware convolution filter and a bilinear interpolator are used to convolve and interpolate initial pixel intensities simultaneously in both the x and y dimensions thereby generating a final output image.

Thus, unlike the ODC method which first processes values in one dimension and then processes values in a second dimension to magnify, the TDC method processes in both dimensions simultaneously. Other than the TDC method processes in both dimensions simultaneously. Other than this distinction and more complex mathematics which are required for simultaneous two-dimensional processing, the TDC method is very similar to the ODC method.

Figure 2:
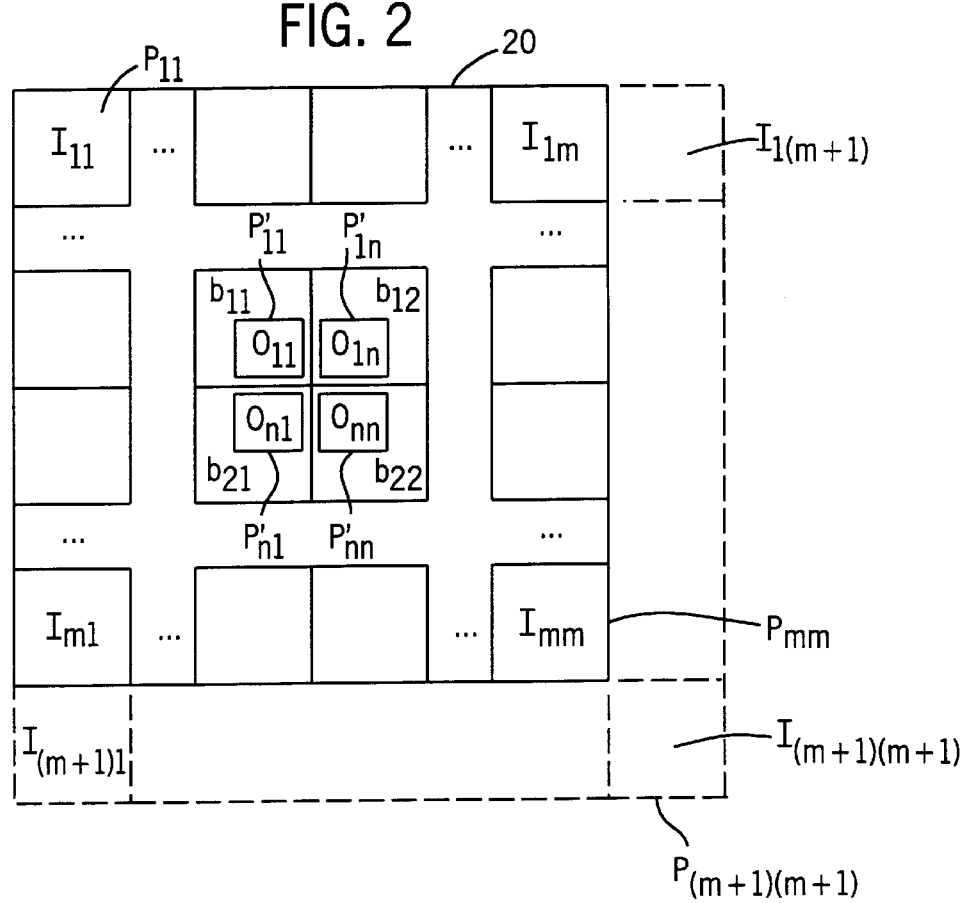
FIG. 2 is a is a schematic illustrating a convolution window in accordance with a second embodiment of the present invention.

For the purpose of this explanation, when referring to the TDC method the term "interpixel interval" will be used to refer to adjacent quarters of four adjacent pixels. Referring to FIG. 2, the general pixel scheme for applying the TDC method to a region of interest is illustrated. The initial region of interest includes a pixel block of (m+1) (m+1) pixels. In FIG. 2, $I_{11}$ through $I_{(m+1)(m+1)}$ denote source image pixel intensities corresponding to pixels of interest $P_{11}$ through $P_{(m+1)(m+1)}$, $b_{ag}$ through $b_{22}$ denote intermediate values obtained by applying a 2D convolution filter to intensities $I_{11}$ through $I_{(m+1)(m+1)}$, numeral 20 outlines a convolution filter window including pixels $P_{11}$ through $P_{mm}$ and $O_{11}$ through $O_{nn}$ represent intensities of output pixels $P_{11}'$ through $P_{nn}'$ obtained by bilinear interpolation between intermediate pixels $b_{11}$, $b_{12}$, $b_{21}$, and $b_{22}$. Generally intensities $I_{11}$ through $I_{mm}$ will be referred to as $I_{ij}$.

Intermediate values $b_{11}$ through $b_{22}$ are obtained by applying the m×m convolution filter to the input pixels $I_{ij}$ according to the following expressions:

$$b_{11} = \sum_{i=1}^{m} \sum_{j=1}^{m} a_{ij} I_{ij} \tag{18}$$

$$b_{12} = \sum_{i=1}^{m} \sum_{j=1}^{m} a_{ij} I_{ij+1} \tag{19}$$

$$b_{21} = \sum_{i=1}^{m} \sum_{j=1}^{m} a_{ij} I_{i+1j} \tag{20}$$

$$b_{22} = \sum_{i=1}^{m}\sum_{j=1}^{m} a_{ij} I_{i+i\,j+1} \quad (21)$$

where $a_{ij}$ are the coefficients of the two-dimensional convolution filter.

Figure 3:
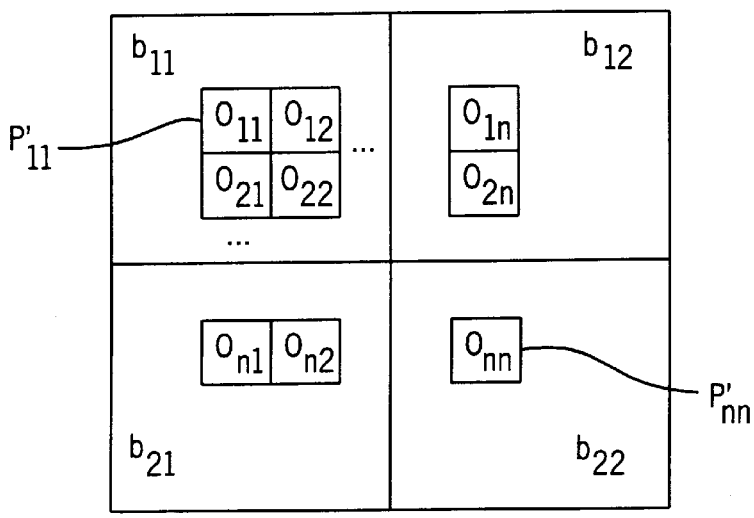
FIG. 3 is a schematic view illustrating a relationship between intermediate intensity values and all pixel intensities according to the second embodiment to the invention.

After intermediate values $b_{11}$ through $b_{22}$ are determined bilinear interpolation is applied to generate output intensities $O_{11}$ through $O_{nn}$. FIG. 3 illustrates the relationship between intermediate values $b_{11}$, $b_{12}$, $b_{21}$, and $b_{22}$ and the output pixels $O_{11}$ through $O_{nn}$. Each of the output pixels $O_{ij}$ occupies a different location relative to the intermediate values $b_{11}$ through $b_{22}$. All the other output pixels generated by the linear interpolation occupy the same relative locations to some intermediate pixels. The values of the output pixels $O_{11}$ through $O_{nn}$, with respect to the intermediate values are given by the following equations:

$$O_{ij} = \frac{(n-i+1)(n-j+1)}{n^2} b_{11} + \frac{(n-i+1)(j-1)}{n^2} b_{12} + \frac{(i-1)(n-j+1)}{n^2} b_{21} + \frac{(i-1)(j-1)}{n^2} b_{22} \quad (22)$$

for i, j=1, . . . , n (n odd), and $$O_{ij} = \frac{(n-i+0.5)(n-j+0.5)}{n^2} b_{11} + \frac{(n-i+0.5)(j-0.5)}{n^2} b_{12} + \frac{(i-0.5)(n-j+0.5)}{n^2} b_{21} + \frac{(i-0.5)(j-0.5)}{n^2} b_{22} \quad (23)$$

for i, j=1, . . . , n (n even).

When the expressions for intermediate values $b_{11}$ through $b_{22}$ from Equations 18 through 21 are substituted in Equation 22, the following expression is obtained:

$$O_{ij} = \frac{(n-i+1)(n-j+1)}{n^2} \sum_{k=1}^{m}\sum_{l=1}^{m} a_{kl} I_{kl} + \frac{(n-i+1)(j-1)}{n^2} \sum_{k=1}^{m}\sum_{l=1}^{m} a_{kl} I_{kl+1} + \frac{(i-1)(n-j+1)}{n^2} \sum_{k=1}^{m}\sum_{l=1}^{m} a_{kl} I_{kl+1l} + \frac{(i-1)(j-1)}{n^2} \sum_{k=1}^{m}\sum_{l=1}^{m} a_{kl} I_{k+1l+1} \quad (24)$$

which can be expresses as:

$$O_{kl} = \sum_{i_1=1}^{m+1}\sum_{i_2=1}^{m+1}\sum_{i_3=1}^{m}\sum_{i_4=1}^{m} \lambda_{i_1 i_2 i_3 i_4} a_{i_3 i_4} I_{i_1 i_2} \quad (25)$$

where $\lambda_{i_1 i_2 i_3 i_4}$ are the constant coefficients from Equations 22. Similar expressions are obtainable using Equations 23.

As well known in the art, using known expressions for bicubic interpolation alternate expressions for pixel values $O_{kl}$ can be obtained which can be collectively expressed as:

$$O_{kl} = \sum_{i=1}^{4}\sum_{j=1}^{4} c_{ij} I_{ij} \quad (26)$$

where $c_{ij}$ are the coefficients derived from the expressions for bicubic interpolation in the case of magnification by n. Comparing Equations 25 and 26 and equating coefficients with corresponding input pixel values $I_{ij}$, a set of up to sixteen linear equations for the filter coefficients $a_{i_3 i_4}$ are obtained which can be collectively expressed as:

$$\sum_{i_3=1}^{m}\sum_{i_4=1}^{m} \lambda_{ij i_3 i_4} a_{i_3 i_4} = c_{ij} \quad (27)$$

There can be less than sixteen equations if the pixels obtained by bilinear interpolation used by the convolution filter do not have any contribution from some input pixels $I_{ij}$. In that case, the number of equations is reduced by the number of such pixels. Repeating this procedure for all of the output pixels $O_{ij}$ (i, j=1, . . . , n) a system of (16n) linear equations for the convolution filter coefficients is obtained which can be expressed in matrix form as:

$$C = \Lambda A \quad (28)$$

where C is a vector of the corresponding coefficients $c_{ij}$ from right side of Equations 26, $\Lambda$ is the matrix of coefficients $\lambda_{ijkl}$ of those linear equations, and A is the vector of m×m filter coefficients $a_{11}$ through $a_{mm}$. For practical values of zoom factors n and filter sizes m by m this represents an over determined system of linear equations. In this case, the coefficients $a_{ij}$ can be determined using the linear least squares method indicated by Equation 17 above:

Upon determining the coefficients $a_{ij}$ of the convolution filter that is to be applied, the whole procedure for zooming digital images is defined.

B. Hardware and Operation

Figure 4:
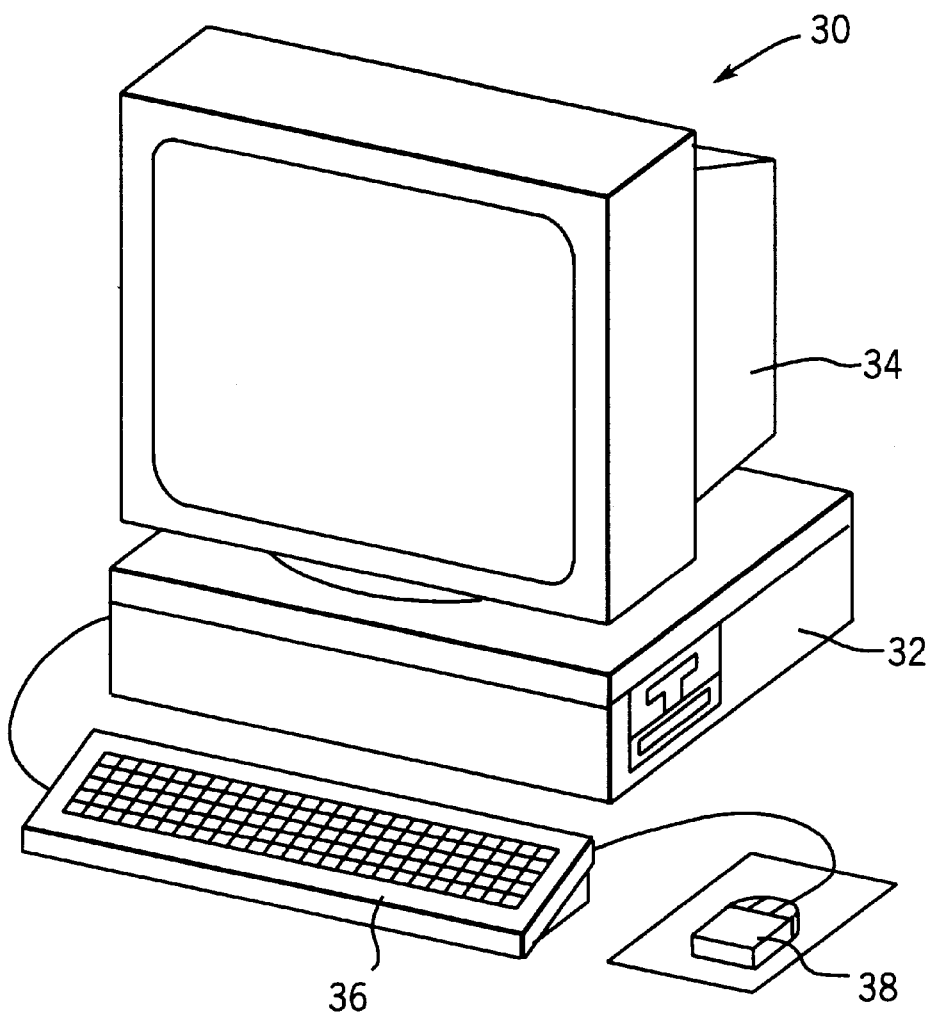
FIG. 4 is a perspective view of a computer system used to facilitate the inventive methods.

Referring now to FIG. 4, a conventional workstation 30 is illustrated which includes a computer 32, a display 34 linked to the computer 32, and two interface devices, a keyboard 36 and a mouse 38. Keyboard 36 and mouse 38 allow a user to provide information to the computer including commands to control the computer 32. Information including images, is displayed on display 34 for observation. For the purpose of this explanation it is assumed that an image is displayed via display 34 and that a workstation user uses either board 36 or mouse 38 to select a region of interest on the initially displayed image to be magnified by a factor of 5 (i.e. n=5).

Figure 9:
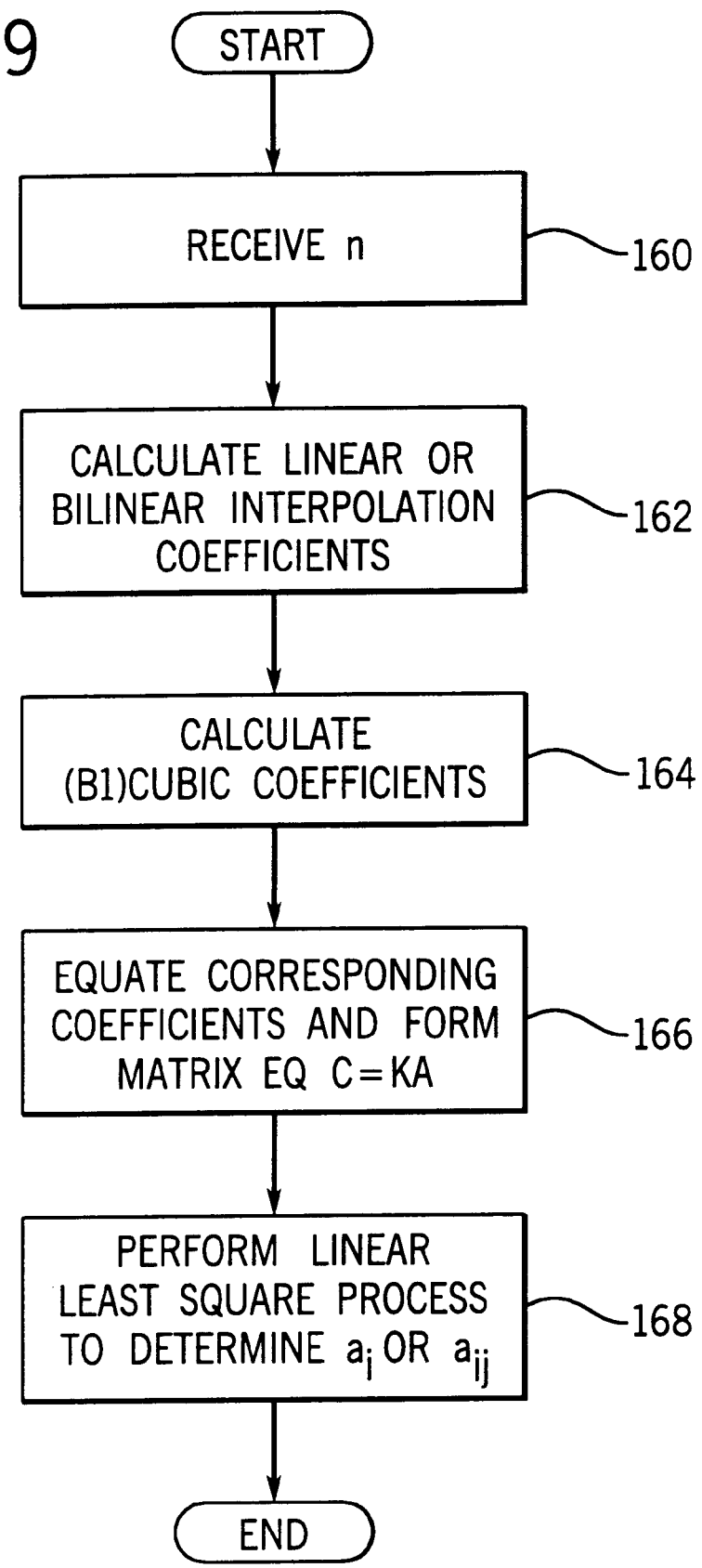
FIG. 9 is a flow chart illustrating operation of the hardware of FIG. 5.

In addition to other processing hardware, computer 32 must include hardware capable of either one-dimensional convolution filtering and linear interpolation or two-dimensional convolution filtering and bilinear interpolation. To this end, referring to FIG. 5, computer 32 includes an interpolation coefficient calculator 40, a cubic coefficient calculator 42 and a linear least square determiner 44. Referring also to FIG. 9, at block 160, calculator 40 receives magnification factor n and uses factor n to determine interpolation coefficients. To this end, on one hand, where a hardware based convolver is only capable of one dimensional convolution and a hardware based interpolator is only capable of linear interpolation, calculator 40 uses the coefficient expressions from Equations 5 and 6 to determine interpolation coefficients at block 162. For example, where n is 5 and m is 6 the four equations corresponding to Equation 15 above for the first output pixel (i.e. n=1) are:

$$\lambda_{11}a_1+\lambda_{12}a_2+\lambda_{13}a_3+\lambda_{14}a_4+\lambda_{15}a_5=c_1 \quad (29)$$

$$\lambda_{21}a_1+\lambda_{22}a_2+\lambda_{23}a_3+\lambda_{24}a_4+\lambda_{25}a_5=c_2 \quad (30)$$

$$\lambda_{31}a_1+\lambda_{32}a_{2+\lambda_{33}}a_{3+\lambda_{34}}a_4+\lambda_{35}a_5=c_3 \quad (31)$$

$$\lambda_{41}a_1+\lambda_{42}a_2+\lambda_{43}a_3+\lambda_{44}a_4+\lambda_{45}a_5=c_1 \quad (32)$$

Looking at Equation 5 for I, where i is 1 corresponding to Equation 29, there is only a single coefficient expression for $a_1$, the expression being $(n-k+1)/n$ and therefore coefficient $\lambda_{11}$ is known to be $(n-k+1)/n$ and all other coefficients $\lambda_{12}$, $\lambda_{13}$, $\lambda_{14}$ and $\lambda_{15}$ are known to be zeros. Where i is 2 corresponding to Equation 30, referring to Equation 5, coefficient $\lambda_{21}$ is $(k-1)/n$, coefficient $\lambda_{22}$ is $(n-k+1)/n$ and all other $\lambda$ coefficients in Equation 30 are zero. Where i is 3 corresponding to Equation 31, coefficient $\lambda_{31}$ is zero, coefficient $\lambda_{32}$ is $(k-1)/n$, coefficient $\lambda_{33}$ is $(n-k+1)/n$ and all other coefficients $\lambda$ in Equation 31 are zeros. Where i is 4 corresponding to Equation 32 coefficients $\lambda_{41}$ and $\lambda_{42}$ are zeros, coefficient $\lambda_{43}$ is $(k-1)/n$, coefficient $\lambda_{44}$ is $(n-k+1)/n$ and all other coefficients are zeros. The k value used in each of the coefficients corresponds to an output pixel and Equations like 29 through 32 are examined for each intended output pixel thereby generating 4n interpolation coefficients $\lambda$ which are provided to determiner 44.

On the other hand, where the hardware convolver is a two dimensional convolver and a bi-linear interpolator is provided, at block 162 calculator 40 uses Equations 22 or 23, depending on if factor n is odd or even, to determine interpolation coefficients $\lambda_{ijkl}$ which are provided to determiner 44.

Figure 5:
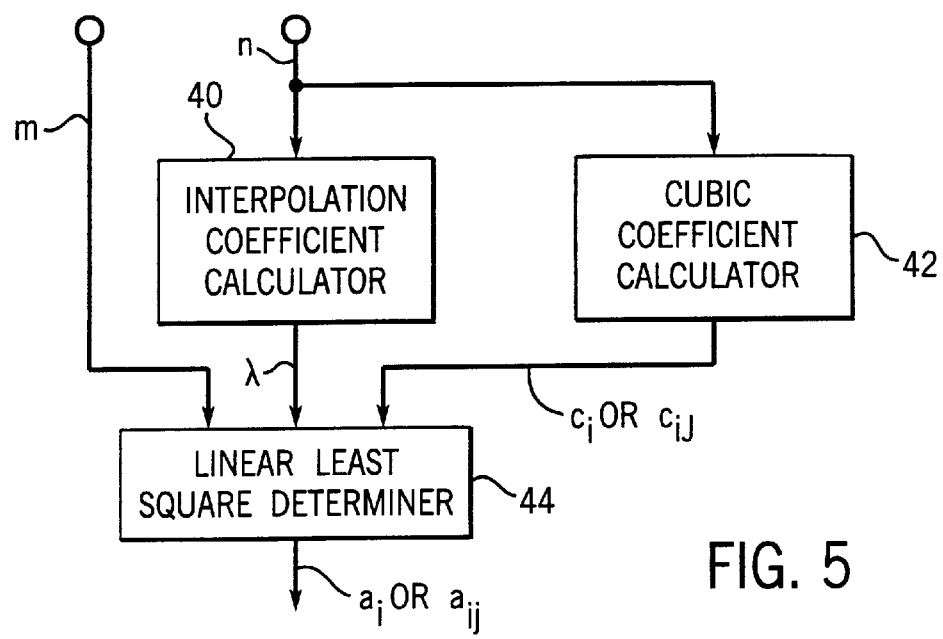
FIG. 5 is a schematic diagram of hardware used in both the first and second embodiments to the present invention.

Referring still to FIGS. 5 and 9, at block 164 cubic coefficient calculator 42 also receives factor n and determines bicubic coefficients. Where the system convolver facilitates only one dimensional convolution calculator 42 uses Equations 9 and 10 through 13 or other similar equations to determine coefficients $c_1$ through $c_4$ for each separate output pixel. Where the system can perform two dimensional convolution, calculator 42 generates sixteen coefficients $c_1$ through $c_{16}$ for each output pixel using conventional bicubic equations which are well known in the art. Thus, 16n coefficients are generated and provided to determiner 44.

In addition to receiving interpolation coefficients $\lambda$ and cubic coefficients c, determiner 44 also receives a value m indicating the filter dimensions. At blocks 166 and 168 determiner 44 forms the matrix equation indicated by Equation 17 and solves the equation to generate m or m×m coefficients a which are required in either Equations 1 and 2 or in Equations 18, 19, 20 and 21. Coefficients $a_i$ or $a_{ij}$ are provided as an output from determiner 44.

Figure 6:
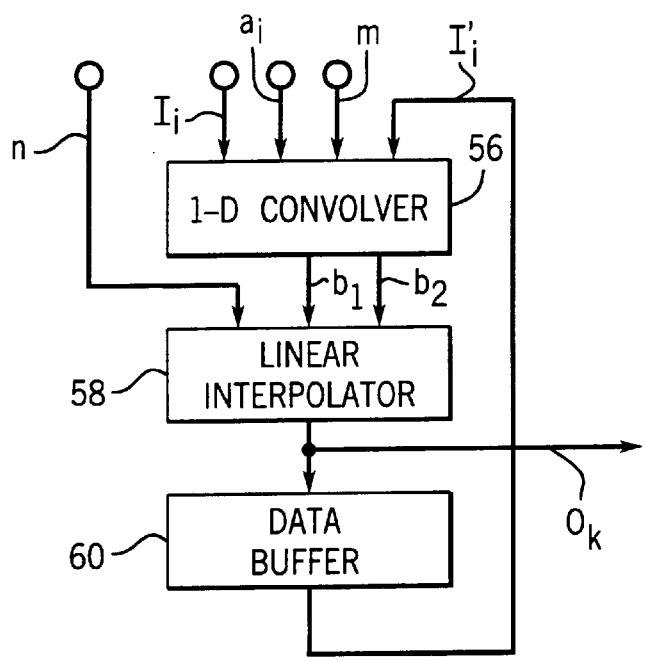
FIG. 6 is a schematic illustrating hardware according to a one dimensional convolution embodiment of the present invention.
Figure 7:
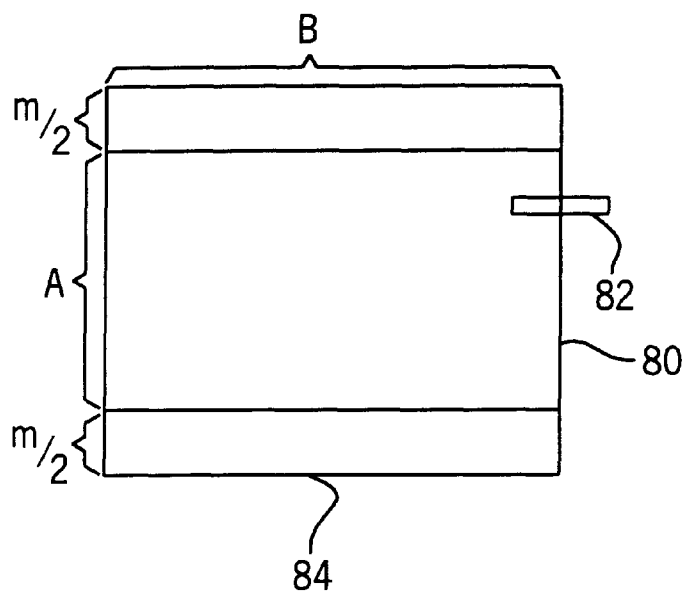
FIG. 7 is a schematic diagram illustrating a region of interest and expanded region of interest according to the present invention.
Figure 8:
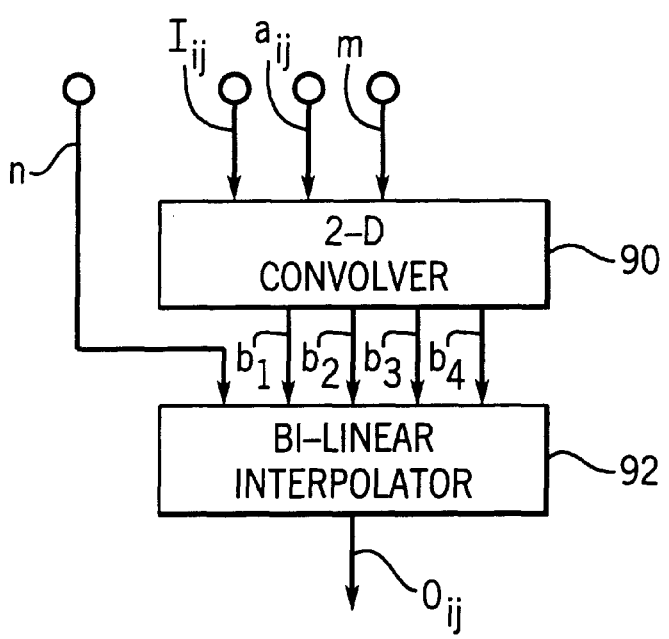
FIG. 8 is similar to FIG. 6, albeit illustrating hardware required for a two-dimensional convolution system according to the present invention.

The remaining hardware in the case of the ODC method is illustrated in FIG. 6 while the remaining hardware in the case of the TDC method is illustrated in FIG. 7. Referring to FIG. 6, to facilitate the ODC method computer 32 (see FIG. 5) further includes a 1D convolver 56, a linear interpolator 58 and a data buffer 60.

Figure 10:
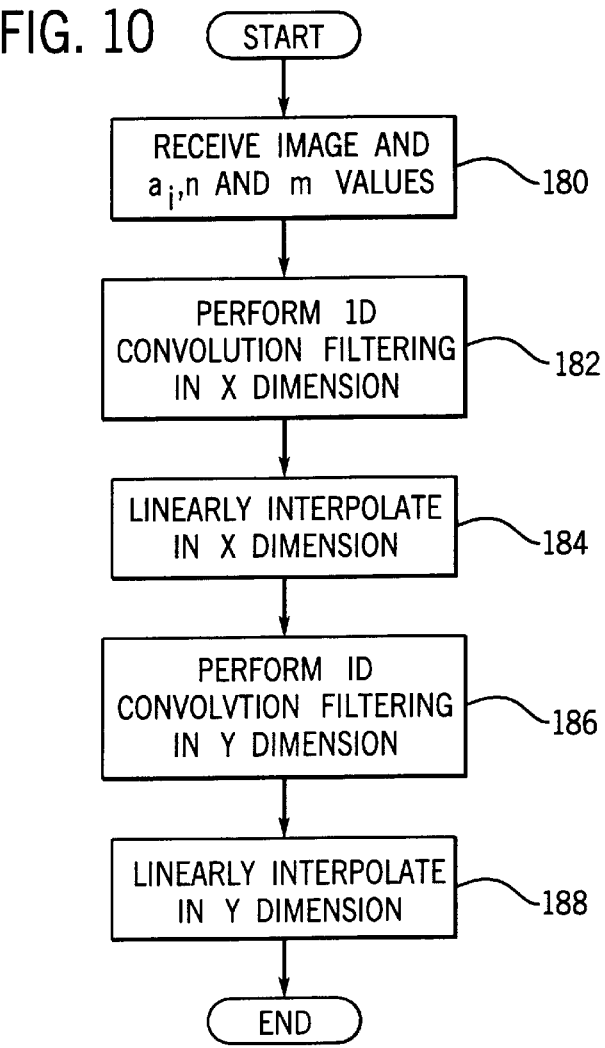
FIG. 10 is a flow chart illustrating operation of the hardware of FIG. 6.

Referring also to FIG. 10 at block 180, convolver 56 receives each of the initial image pixel intensity $I_i$ which corresponds to the expanded region of interest. Referring also to FIG. 7, a region of interest 80 (i.e. region of an image to be magnified) includes A rows and B columns. To convolve and interpolate convolution windows for each interval in the region of interest 80 in the x dimension (i.e. horizontal), the windows include m+1 pixel intensities corresponding to m+1 pixels which are adjacent, and in the same row as, the interval of interest. Thus, for intervals on the lateral edges of region 80 corresponding windows will extend laterally from the region of interest by as much as m/2 pixels. One such laterally extending window is identified by number 82. Pixels which are laterally positioned with respect to the region of interest 80 are similar to intervals within region 80 in that they have not yet been convoluted and interpolated. Therefore, convolution windows which laterally extend during the first pass of an image through hardware include only non-convoluted pixels.

However, after intervals within a region of interest have been expanded in the x dimension, pixels in rows directly above and below the region of interest have not been expanded. Thus, upon the second pass of the image through the hardware to expand intervals in the y dimension, for intervals near the top and bottom of the region which has already been expanded in the x-dimension, suitable convolution windows cannot be selected. For example, for an interval in the top row of an x-dimension expanded region, when a convolution window including 5 pixels is chosen, while the pixels below the interval of interest and within the window have been expanded in the x-dimension like the interval of interest, the pixels above the interval of interest have not been similarly expanded in the x-dimension and therefore cannot be suitably used to convolute and interpolate the interval of interest.

To overcome this problem, referring to FIG. 7, the region of interest 80 is expanded to include m/2 rows of pixels above and m/2 rows of pixels below the initial region of interest resulting in expanded region 84. Thereafter, after expansion in the x dimension, expansion in the y dimension can be performed on intervals in rows corresponding to the original region of interest using convolution windows for top and bottom located pixels which extend into region 84 above region 80 and similarly into the region below region 80.

Referring still to FIGS. 6 and 10, in addition to receiving intensity signals $I_i$ for each pixel within the expanded region 84, at block 180 convolver 56 also receives convolution filter coefficients $a_i$ from determiner 44 (see FIG. 5), filter size value m and factor n. Convolver 56 first selects pixel pairs adjacent each interval of interest and then selects a separate convolution window for each adjacent pixel on the expanded region of interest, and, at block 182, forms Equations 1 and 2 generating intermediate values $b_1$ and $b_2$ for the windows.

At block 184 interpolator 58 receives values $b_1$ and $b_2$ and factor n and solves either Equation 3 or Equation 4 (depending on if factor n is odd or even) for each of k output pixels to determine pixel intensities $O_1$ through $O_k$. Intensities $O_1$ through $O_k$ are determined for each interval in the original region of interest 84 (see FIG. 7) and together intensities $O_1$–$O_k$ define an interpolated image (i.e. the interpolated region expanded in the x dimension). The interpolated image is temporarily stored in buffer 60. Once the interpolated image has been completed, that image, including all pixel intensities, is provided to convolver 56 a second time. At block 186, for every interval between adjacent pixels in adjacent rows of the interpolated image which corresponded to rows in the initial region of interest 80 (see FIG. 7), convolver 56 identifies the adjacent pixels and selects a convolution column window for each adjacent pixel and convolves the intensities in the windows according to Equations 1 and 2 generating intermediate values $b_1$ and $b_2$. At block 188, interpolator 58 receives values $b_1$ and $b_2$, performs either Equation 3 or Equation 4 (depending on if n is odd or even) and generates final output intensities which together define the final and magnified image. Computer 32 (see FIG. 5) uses intensities $O_k$ to drive display 34 to display the magnified region of interest.

Figure 11:
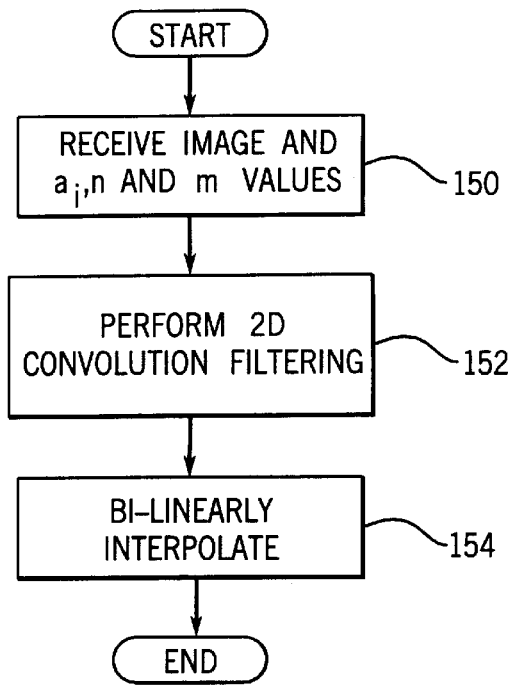
FIG. 11 is a flow chart illustrating operation of the hardware of FIG. 8.

Referring now to FIG. 9, the remaining hardware to facilitate the TDC method includes a 2D convolver 90 and a bi-linear interpolator 92. Referring also to FIG. 11, at block 150 convolver 90 receives the image pixel intensities $I_i$ comprising the region of interest, the convolution filter coefficients $a_i$, factor n and filter value m. Convolver 90 selects four adjacent pixels for each interpixel interval and then selects a separate convolution window for each interpixel interval within the region of interest. At block 152 convolver 90 performs Equations 18 through 21 to determine intermediate values $b_{11}$, $b_{12}$, $b_{21}$ and $b_{22}$. At block 152 interpolator 92 receives each of values $b_{11}$ through $b_{22}$ and factor n for each interval in the region of interest and interpolates each set of four values $b_{11}$ through $b_{22}$ to generate nxn pixel intensities $O_{ij}$ by solving either Equation 22 or Equation 23, depending on if factor n is odd or even. Pixel intensities $O_{ij}$ define the final output magnified image and can be used by computer 32 (see FIG. 5) to display the magnified image on display 34.

It should be understood that the methods and apparatuses described above are only exemplary and do not limit the scope of the invention, and that various modifications could be made by those skilled in the art that would fall under the scope of the invention.

To apprise the public of the scope of this invention, we make the following claims.

What is claims is:

1. A method to be used with a digital imaging system to facilitate magnification of a region of interest on an initial digital image wherein the region of interest includes a plurality of pixels of interest, adjacent portions of adjacent pixels of interest forming interpixel intervals of interest, each pixel of interest characterized by a pixel intensity, the system including convolution filter and interpolation hardware, the method comprising the steps of:
    (A) for each interpixel interval of interest, identifying adjacent pixels;
    (B) for each adjacent pixel:
        (i) selecting a convolution window and, for each window:
            (a) determining a convolution filter coefficient for each window pixel;
            (b) convoluting the intensities of the pixels in the window as a function of the coefficients to generate an intermediate value; and
        (ii) interpolating the intermediate values to generate at least two interpolated pixel intensities, the interpolated pixel intensities together forming an interpolated image.

2. The method of claim 1 wherein the initial pixel array is arranged in y columns and x rows and wherein the step of selecting includes the step of, for each interpixel interval between pixels in adjacent columns, selecting a row convolution window for each adjacent pixel consisting of pixels which are in the same row as the interpixel interval of interest and wherein, after step (B)(ii) is completed, the method further includes the steps of:
    for each interpixel interval between pixels in adjacent rows on the interpolated image, selecting a separate column convolution window for each adjacent pixel on the interpolated image, each column window including image pixels within the same column as, and proximate the interpixel interval of interest;
    for each column window:
        (i) determining a convolution filter coefficient for each window pixel;
        (ii) convoluting the pixel intensities in each window as a function of the coefficients to generate an intermediate value; and
        (iii) interpolating the intermediate values to generate a final pixel intensity, the final pixel intensities together forming the final image.

3. The method of claim 2 wherein n is a magnification factor, the step of interpolating to generate interpolated pixel intensities includes interpolating to generate n interpolated pixel intensities and the step of interpolating to generate final pixel intensities includes interpolating to generate n final intensities.

4. The method of claim 2 wherein the window is an m×1 array and wherein an expanded region of interest includes m/2 rows of pixels above and below the region of interest and the step of selecting row convolution windows for each interval of interest includes selecting row convolution windows for each interval in the expanded region of interest.

5. The method of claim 1 wherein each of the windows includes the same number of pixels.

6. The method of claim 1 wherein the image is to be magnified by a factor n and the step of determining convolution filter coefficients includes the steps of:
    calculating linear interpolation coefficients;
    calculating cubic interpolation coefficients; and
    mathematically combining the cubic interpolation coefficients and linear interpolation coefficients to determine the filter coefficients.

7. The method of claim 6 wherein the step of mathematically combining includes the step of solving the following equation:

$$A=(\Lambda^T\Lambda)^{-1}\Lambda^T C$$

where A is a filter coefficient matrix, $\Lambda$ is a linear interpolation matrix and C is a vector corresponding to the cubic interpolation coefficients.

8. The method of claim 6 wherein the image is to be magnified by a factor n and the step of interpolating includes the step of mathematically combining each of the intermediate values as a function of factor n.

9. A method to be used with a digital imaging system to facilitate magnification of a region of interest on an initial digital image wherein the region of interest includes a plurality of pixels of interest, adjacent portions of adjacent pixels of interest forming interpixel intervals of interest, each pixel of interest characterized by a pixel intensity, the system including convolution filter and interpolation hardware, the method comprising the steps of:
    (A) for each interpixel interval of interest, identifying adjacent pixels;
    (B) for each adjacent pixel;
        (i) selecting a convolution window and, for each window:
            (a) determining a convolution filter coefficient for each window pixel;
            (b) convoluting the intensities of the pixels in the window as a function of the coefficients to generate an intermediate value; and
        (ii) interpolating the intermediate values to generate at least two interpolated pixel intensities, the interpolated pixel intensities together forming an interpolated image;
    wherein the image is to be magnified by a factor n and the step of determining convolution filter coefficients includes the step of:
    calculating linear interpolation coefficients;
    calculating cubic interpolation coefficients; and
    mathematically combining the cubic interpolation coefficients and linear interpolation coefficients to determine the filter coefficients;

the step of interpolating including mathematically combining each of the intermediate values as a function of factor n;

wherein the step of mathematically combining includes the step of, where n is odd, solving the following equation:

$$O_k = \frac{(n-k+1)}{n}\sum_{i=1}^{m} a_i I_i + \frac{(k-1)}{n}\sum_{i=1}^{m} a_i I_{i+1}$$

and, where n is even, solving the following equation:

$$O_k = \frac{(n-k+0.5)}{n}\sum_{i=1}^{m} a_i I_i + \frac{(k-0.5)}{n}\sum_{i=1}^{m} a_i I_{i+1}$$

where $O_k$ is output pixel intensity, n is the factor by which the image is to be magnified, k is 1 through n, $a_i$ are coefficients of the convolution filter, m is the number of pixels in each window and $I_i$ are the initial pixel intensities of pixels in the convolution window.

10. The method of claim 1 wherein the convolution window is one dimensional and includes m pixels and the step of convoluting includes solving the following equations:

$$b_1 = \sum_{i=1}^{m} a_i I_i$$

and $$b_2 = \sum_{i=1}^{m} a_i I_{i+1}$$

where $b_1$ and $b_2$ are the intermediate values, $a_i$ are the linear interpolation coefficients and $I_i$ are the initial pixel intensities of pixels in the convolution window.

11. The method of claim 1 wherein the hardware is capable of performing high speed two dimensional convolution and bilinear interpolation, the step of selecting convolution windows including the step of selecting four m×m windows, each window including the interval of interest.

12. A method to be used with a digital imaging system to facilitate magnification of a region of interest on an initial digital image wherein the region of interest includes a plurality of pixels of interest, adjacent portions of adjacent pixels of interest forming interpixel intervals of interest, each pixel of interest characterized by a pixel intensity, the system including convolution filter and interpolation hardware, the method comprising the steps of:

(C) for each interpixel interval of interest, identifying adjacent pixels;

(D) for each adjacent pixel;

(iii) selecting a convolution window and, for each window:

(c) determining a convolution filter coefficient for each window pixel;

(d) convoluting the intensities of the pixels in the window as a function of the coefficients to generate an intermediate value; and interpolating the intermediate values to generate at least two interpolated pixel intensities, the interpolated pixel intensities together forming an interpolated image;

wherein the hardware is capable of performing high speed two dimensional convolution and bilinear interpolation, the step of selecting convolution windows including the step of selecting four m×m windows, each window including the interval of interest;

wherein the step of convoluting includes solving the following equations:

$$b_{11} = \sum_{i=1}^{m}\sum_{j=1}^{m} a_{ij} I_{ij}$$

$$b_{22} = \sum_{i=1}^{m}\sum_{j=1}^{m} a_{ij} I_{ij+1}$$

where $b_{11}$ and $b_{22}$ are intermediate values, $a_{ij}$ are the linear interpolation coefficients, m is the number of pixels in each window and $I_{ij}$ and $I_{i+ij+1}$ are initial pixel intensities of pixels in the convolution window.

13. The method of claim 12 wherein the step of interpolating includes the steps of, where n is odd, solving the following equation:

$$O_{ij} = \frac{(n-i+1)(n-j+1)}{n^2}b_{11} + \frac{(n-i+1)(j-1)}{n^2}b_{12} + \frac{(i-1)(n-j+1)}{n^2}b_{21} + \frac{(i-1)(j-1)}{n^2}b_{22}$$

and where n is even, solving the following equation:

$$O_{ij} = \frac{(n-i+0.5)(n-j+0.5)}{n^2}b_{11} + \frac{(n-i+0.5)(j-0.5)}{n^2}b_{12} + \frac{(i-0.5)(n-j+0.5)}{n^2}b_{21} + \frac{(i-0.5)(j-0.5)}{n^2}b_{22}$$

14. A pulse sequencing program to be used with a digital imaging system to facilitate magnification of a region of interest on an initial digital image wherein the region of interest includes a plurality of pixels of interest, adjacent portions of adjacent pixels of interest forming interpixel intervals of interest, each pixel of interest characterized by a pixel intensity, the sequencing program performing the steps of:

(A) for each interpixel interval of interest, identifying adjacent pixels;

(B) for each adjacent pixel:

(i) selecting a convolution window and for each window:

(a) determining a convolution filter coefficient for each window pixel;

(b) convoluting the intensities of the pixels in the window using the coefficients to generate an intermediate value; and (ii) interpolating the intermediate values to generate at least two interpolated pixel intensities, the interpolated pixel intensities together forming an interpolated image.

15. The program of claim 14 wherein the initial pixel array is arranged in y columns and x rows and wherein the step of selecting includes the step of, for each interval of interest between pixels in adjacent columns, selecting a row convolution window for each adjacent pixel consisting of pixels which are in the same row as the interval of interest and wherein, after step (B)(ii) is completed, the program further includes the steps of:

for each interval between pixels in adjacent rows on the interpolated image, selecting a separate column convolution window for each adjacent pixel on the interpolated image, each column window including image pixels within the same column as, and proximate the interval;

for each column window:
(i) determining a convolution filter coefficient for each window pixel;
(ii) convoluting the pixel intensities in each window using the coefficients to generate an intermediate value; and
(iii) interpolating the intermediate values to generate a final pixel intensity, the final pixel intensities together forming the final image.

16. The program of claim 15 wherein n is a magnification factor, the step of interpolating to generate interpolated pixel intensities includes interpolating to generate n interpolated pixel intensities and the step of interpolating to generate final pixel intensities includes interpolating to generate n final intensities.

17. The program of claim 15 wherein each window is an m×1 array and wherein an expanded region of interest includes m/2 rows of pixels above and below the region of interest and the step of selecting first and second convolution windows for each interval of interest includes selecting first and second row convolution windows for each interval in the expanded region of interest.

18. The program of claim 14 wherein each of windows includes the same number of pixels.

19. The program of claim 14 wherein the image is to be magnified by a factor n and the step of determining convolution filter coefficients includes the steps of:
calculating linear interpolation coefficients;
calculating cubic interpolation coefficients; and
mathematically combining the cubic interpolation coefficients and linear interpolation coefficients to determine the filter coefficients.

20. The program of claim 19 wherein the step of mathematically combining includes the step of solving the following equation:

$$A = (\Lambda^T \Lambda)^{-1} \Lambda^T C$$

where A is a filter coefficient matrix, $\Lambda$ is a linear interpolation matrix and C is a vector corresponding to the cubic interpolation coefficients.

21. The program of claim 19 wherein the image is to be magnified by a factor n and the step of interpolating includes the step of mathematically combining each of the intermediate values as a function of factor n.

22. A pulse sequence program to be used with a digital imaging system to facilitate magnification of a region of interest on an initial digital image wherein the region of interest includes a plurality of pixels of interest, adjacent portions of adjacent pixels of interest forming interpixel intervals of interest, each pixel of interest characterized by a pixel intensity, the sequencing program performing the steps of:

(A) for each interpixel interval of interest, identifying adjacent pixels;
(B) for each adjacent pixel:
(i) selecting a convolution window and for each window:
(a) determining a convolution filter coefficient for each window pixel;
(b) convoluting the intensities of the pixels in the window using the coefficients to generate an intermediate value; and
(ii) interpolating the intermediate values to generate at least two interpolated pixel intensities, the interpolated pixel intensities together forming an interpolated image;

wherein the image is to be magnified by a factor n and the step of determining convolution filter coefficients includes the steps of:
calculating linear interpolation coefficients;
calculating cubic interpolation coefficients; and
mathematically combining the cubic interpolation coefficients and linear interpolation coefficients to determine the filter coefficients;

wherein the image is to be magnified by a factor n and the step of interpolating includes the step of mathematically combining each of the intermediate values as a function of factor n;

wherein the step of mathematically combining includes the step, where n is odd, of solving the following equation:

$$O_k = \frac{(n-k+1)}{n}\sum_{i=1}^{m} a_i I_i + \frac{(k-1)}{n}\sum_{i=1}^{m} a_i I_{i+1}$$

and where n is even, solving the following equation:

$$O_k = \frac{(n-k+1)}{n}\sum_{i=1}^{m} a_i I_i + \frac{(k-1)}{n}\sum_{i=1}^{m} a_i I_{i+1}$$

where $O_k$ is output pixel intensity, n is the factor by which the image is to be magnified, k is 1 through n, $a_i$ are coefficients of the convolution filter, m is the number of pixels in each window and $I_i$ and $I_{i+1}$ are the initial pixel intensities of pixels in the convolution window.

23. A pulse sequence program to be used with a digital imaging system to facilitate magnification of a region of interest on an initial digital image wherein the region of interest includes a plurality of pixels of interest, adjacent portions of adjacent pixels of interest forming interpixel intervals of interest, each pixel of interest characterized by a pixel intensity, the sequencing program performing the steps of:

(A) for each interpixel interval of interest, identifying adjacent pixels;
(C) for each adjacent pixel:
(i) selecting a convolution window and for each window:
(a) determining a convolution filter coefficient for each window pixel;
(b) convoluting the intensities of the pixels in the window using the coefficients to generate an intermediate value; and
(ii) interpolating the intermediate values to generate at least two interpolated pixel intensities, the interpolated pixel intensities together forming an interpolated image;

wherein the convolution window is one dimensional and includes m pixels and the step of convoluting includes solving the following equations:

$$b_1 = \sum_{i=1}^{m} a_i I_i$$

-continued and $$b_2 = \sum_{i=1}^{m} a_i I_{i+1}$$

where $b_1$ and $b_2$ are the intermediate values, ai are the linear interpolation coefficients and $I_i$ are the initial pixel intensities of pixels in the convolution window.

24. The program of claim 14 wherein the hardware is capable of performing high speed two dimensional convolution and bilinear interpolation, the step of selecting convolution windows includes the step of selecting four m×m window including the pixel of interest.

25. The program of claim 23 wherein the step of convoluting includes solving the following equations:

$$b_{11} = \sum_{i=1}^{m} \sum_{j=1}^{m} a_{ij} I_{ij}$$

$$b_{12} = \sum_{i=1}^{m} \sum_{j=1}^{m} a_{ij} I_{ij+1}$$

$$b_{21} = \sum_{i=1}^{m} \sum_{j=1}^{m} a_{ij} I_{i+1j}$$

$$b_{22} = \sum_{i=1}^{m} \sum_{j=1}^{m} a_{ij} I_{i+ij+1}$$

where $b_{11}, b_{12}, b_{21}$, and $b_{22}$ are intermediate values, $a_{ij}$ are the linear interpolation coefficients and $I_{ij}, I_{ij+1}, I_{I+1j}$ and $I_{I+ij+1}$ are the initial pixel intensities of pixels in the convolution window.

26. An apparatus to be used with a digital imaging system to facilitate magnification by a factor n of a region of interest on an initial digital image wherein the region of interest includes a plurality of pixels of interest, adjacent portions of adjacent pixels of interest forming interpixel intervals of interest, each pixel of interest characterized by a pixel intensity, the apparatus comprising:
 a first calculator which, based on factor n, generates cubic coefficients;
 a second calculator which, based on factor n, determines interpolation coefficients;
 a determiner which mathematically combines the cubic and interpolation coefficients to determine a plurality of convolution filter coefficients;
 a convolver which, for each interval of interest:
  identifies pixels adjacent interpixel intervals of interest;
  for each adjacent pixel, selects a convolution window;
  for each convolution window, convolutes the pixel intensities of the pixels in each window using the convolution coefficients to generate an intermediate value; and
 an interpolator which interpolates the intermediate values to generate at least two interpolated pixel intensities, the interpolated pixel intensities together forming an interpolated image.

27. The apparatus of claim 26 wherein the initial pixel array is arranged in y columns and x rows and wherein when selecting, the convolver, for each interval of interest between pixels in adjacent columns, selects a row convolution window for each adjacent pixel consisting of pixels which are in the same row as the interval of interest and wherein, after the interpolated image has been generated, the interpolated image is provided to the convolver which, for each interval between pixels in adjacent rows on the interpolated image, selects a separate column convolution window for each adjacent pixel on the interpolated image, each column window including adjacent image pixels within the same column as, and proximate the interval, for each column window, convolutes the pixel intensities in each window using the coefficients to generate an intermediate value, the intermediate values provided to the interpolator which again interpolates the intermediate values to generate a final pixel intensity, the final pixel intensities together forming the final image.

28. The apparatus of claim 27 wherein each window includes an m×1 array and wherein an expanded region of interest includes m/2 rows of pixels above and below the region of interest and the convolver selects first and second row convolution windows for each interval in the expanded region of interest.

29. The apparatus of claim 26 wherein each of the first and second sub-windows include m pixels.

30. The apparatus of claim 26 wherein the determiner mathematically combines by solving the following equation:

$$A = (\Lambda^T \Lambda)^{-1} \Lambda^T C$$

where A is a filter coefficient matrix, $\Lambda$ is a linear interpolation matrix and C is a vector corresponding to the cubic interpolation coefficients.

31. An apparatus to be used with a digital imaging system to facilitate magnification by a factor n of a region of interest on an initial digital image wherein the region of interest includes a plurality of pixels of interest, adjacent portions of adjacent pixels of interest forming interpixel intervals of interest, each pixel of interest characterized by a pixel intensity, the apparatus comprising:
 a first calculator which, based on factor n, generates cubic coefficients;
 a second calculator which, based on factor n, determines interpolation coefficients;
 a determiner which mathematically combines the cubic and interpolation coefficients to determine a plurality of convolution filter coefficients;
 a convolver which, for each interval of interest;
  identifies pixels adjacent interpixel intervals of interest;
  for each adjacent pixel, selects a convolution window;
  for each convolution window, convolutes the pixel intensities of the pixels in each window using the convolution coefficients to generate an intermediate value; and
 an interpolator which interpolates the intermediate values to generate at least two interpolated pixel intensities, the interpolated pixel intensities together forming an interpolated image;
 wherein the determiner mathematically combines by solving the following equation:

$$A = (\Lambda^T \Lambda)^{-1} \Lambda^T C$$

where A is a filter coefficient matrix, $\Lambda$ is a linear interpolation matrix and C is a vector corresponding to the cubic interpolation coefficients;

wherein the convolver convolves by solving the following equations:

$$b_1 = \sum_{i=1}^{m} a_i I_i$$

and $$b_2 = \sum_{i=1}^{m} a_i I_{i+1}$$

where $b_1$ and $b_2$ are the intermediate values, $a_i$ are the linear interpolation coefficients and $I_i$ are the initial pixel intensities of pixels in the convolution window.

32. The apparatus of claim 31 wherein the interpolator interpolates by, where n is odd, solving the following equation:

$$O_k = \frac{(n-k+1)}{n}\sum_{i=1}^{m} a_i I_i + \frac{(k-1)}{n}\sum_{i=1}^{m} a_i I_{i+1}$$

and where n is even, solving the following equation:

$$O_k = \frac{(n-k+0.5)}{n}\sum_{i=1}^{m} a_i I_i + \frac{(k-0.5)}{n}\sum_{i=1}^{m} a_i I_{i+1}$$

where $O_k$ is output pixel intensity, n is the factor by which the image is to be magnified, k is 1 through n, $a_i$ are coefficients of the convolution filter, m is the number of pixels in each window and $I_i$ and $I_{i+1}$ are the initial pixel intensities of pixels in the convolution window.

33. An apparatus to be used with a digital imaging system to facilitate magnification by a factor n of a region of interest on an initial digital image wherein the region of interest includes a plurality of pixels of interest, adjacent portions of adjacent pixels of interest forming interpixel intervals of interest, each pixel of interest characterized by a pixel intensity, the apparatus comprising:
- a first calculator which, based on factor n, generates cubic coefficients;
- a second calculator which, based on factor n, determines interpolation coefficients;
- a determiner which mathematically combines the cubic and interpolation coefficients to determine a plurality of convolution filter coefficients;
- a convolver which, for each interval of interest;
  identifies pixels adjacent interpixel intervals of interest;
  for each adjacent pixel, selects a convolution window;
  for each convolution window, convolutes the pixel intensities of the pixels in each window using the convolution coefficients to generate an intermediate value; and
- an interpolator which interpolates the intermediate values to generate at least two interpolated pixel intensities, the interpolated pixel intensities together forming an interpolated image;

wherein the convolver selects four two-dimensional convolution windows having dimensions m×m, each window including the interval of interest.

34. The apparatus of claim 33 wherein the convolver convolves by solving the following equations:

$$b_{11} = \sum_{i=1}^{m}\sum_{j=1}^{m} a_{ij} I_{ij}$$

$$b_{12} = \sum_{i=1}^{m}\sum_{j=1}^{m} a_{ij} I_{ij+1}$$

$$b_{21} = \sum_{i=1}^{m}\sum_{j=1}^{m} a_{ij} I_{i+1j}$$

$$b_{22} = \sum_{i=1}^{m}\sum_{j=1}^{m} a_{ij} I_{i+ij+1}$$

where $b_{11}, b_{12}, b_{21}$, and $b_{22}$ are intermediate values, $a_{ij}$ are the linear interpolation coefficients and $I_{ij}$, $I_{ij+1}$, $I_{I+1j}$ and $I_{I+ij+1}$ are the initial pixel intensities of pixels in the convolution window.

35. The apparatus of claim 34 wherein the interpolator interpolates by, where n is odd, solving the following equation:

$$Q_{ij} = \frac{(n-i+1)(n-j+1)}{n^2}b_{11} + \frac{(n-i+1)(j-1)}{n^2}b_{12} + \frac{(i-1)(n-j+1)}{n^2}b_{21} + \frac{(i-1)(j-1)}{n^2}b_{22}$$

and, where n is even, solving:

$$O_{ij} = \frac{(n-i+0.5)(n-j+0.5)}{n^2}b_{11} + \frac{(n-i+0.5)(j-0.5)}{n^2}b_{12} + \frac{(i-0.5)(n-j+0.5)}{n^2}b_{21} + \frac{(i-0.5)(j-0.5)}{n^2}b_{22}$$

where $O_{ij}$ is output pixel intensity.380 where $O_{ij}$ is output pixel intensity.

* * * * *

UNITED STATES PATENT AND TRADEMARK OFFICE
CERTIFICATE OF CORRECTION

PATENT NO. : 6,236,766 B1
DATED : May 22, 2001
INVENTOR(S) : Aleksander Zavaljevski et al.

It is certified that error appears in the above-identified patent and that said Letters Patent is hereby corrected as shown below:

Column 4,
Line 56, "t o a b lock" should be -- to a block --.

Column 8,
Line 46, "bag" should be -- $b_{11}$ --.

Column 13,
Line 36, "pixel:" should be -- pixel; --.

Column 16,
Line 34, -- where $O_{ij}$ is output pixel intensity and $b_{12}$ and $b_{21}$ are intermediate values -- should be inserted after the equation at the end of the claim.

Column 19,
Line 9, "coefficients and" should be -- coefficients, m is the number of pixels in each window and --.

Column 21,
Line 13, "coefficients and" should be -- coefficients, m is the number of pixels in each window and --.

Signed and Sealed this

Eighteenth Day of June, 2002

*Attest:*

JAMES E. ROGAN
*Attesting Officer*    *Director of the United States Patent and Trademark Office*